(No Model.)
2 Sheets—Sheet 1.
J. M. FOSTER.
PRESSURE REGULATOR.
No. 583,366.
Patented May 25, 1897.
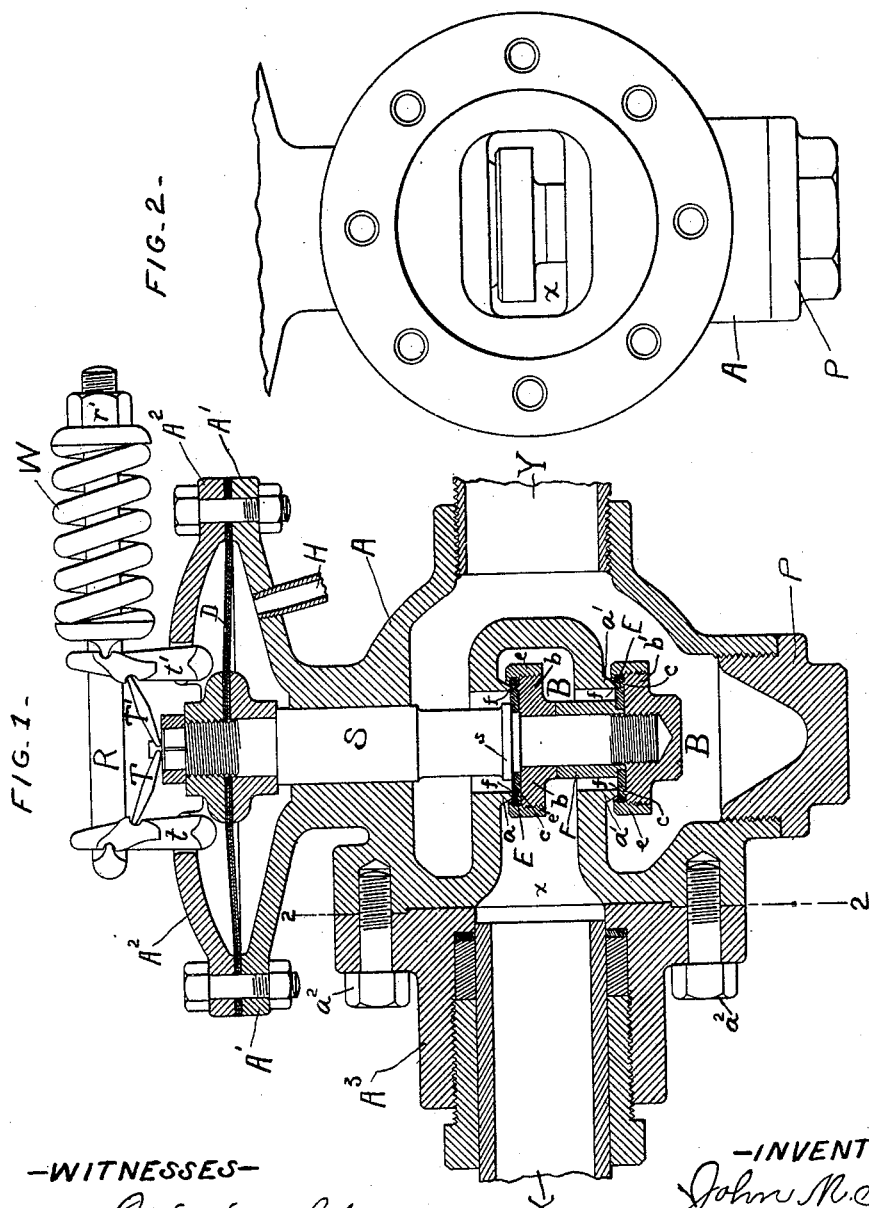
WITNESSES
F. W. Wright
S. C. Connor
INVENTOR
John M. Foster
BY Howson & Howson
HIS ATTORNEYS (No Model.) 2 Sheets—Sheet 2.

J. M. FOSTER.
PRESSURE REGULATOR.

No. 583,366. Patented May 25, 1897.

WITNESSES:
F. W. Wright
S. C. Connor

INVENTOR
John M. Foster
BY
Howson & Howson
ATTORNEYS.

UNITED STATES PATENT OFFICE.

JOHN M. FOSTER, OF ELIZABETH, NEW JERSEY.

PRESSURE-REGULATOR.

SPECIFICATION forming part of Letters Patent No. 583,366, dated May 25, 1897.

Application filed October 31, 1896. Serial No. 610,727. (No model.)

*To all whom it may concern:*

Be it known that I, JOHN M. FOSTER, a citizen of the United States of America, and a resident of Elizabeth, Union county, New Jersey, have invented Improvements in Pressure-Regulators, of which the following is a specification.

My invention relates to that class of pressure regulators and governors in which the movement of the valve controlling the pressure-supply is itself controlled by the delivery-pressure of the fluid acting upon a diaphragm or piston against the action of a spring or weight.

The regulator of my present invention is primarily designed for the maintenance of a uniform delivery-pressure from extreme high initial or supply pressures, such as are used in connection with compressed-air motors—as, for instance, on street cars, mine-locomotives, &c., where the initial air-pressure is sometimes carried as high as three thousand pounds, and where the delivery-pressure may vary considerably, say from one hundred to two hundred pounds.

The main object of this invention is to so construct the regulator as to insure a tight joint and avoid leakage past the valve when closed, notwithstanding the high pressures employed, to prevent buckling or bulging of the diaphragms, and to provide for accelerating the delivery-pressure whenever desired.

Figure 3:
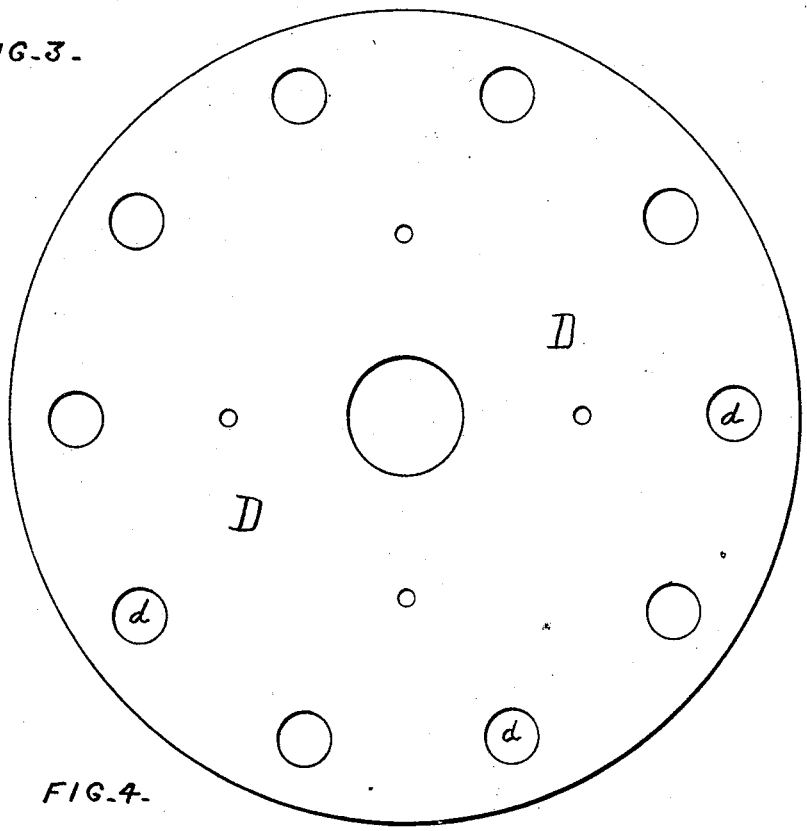
Figure 4:
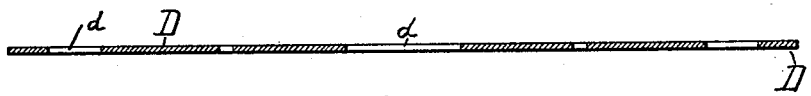
Figure 5:
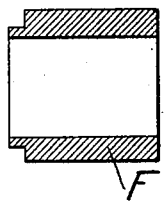
Figure 6:
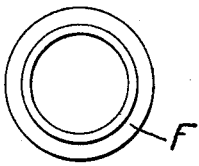

In the accompanying drawings, Figure 1 is a vertical section of a regulator constructed in accordance with my invention. Fig. 2 is a view on line 2 2, Fig. 1. Fig. 3 is a face view, and Fig. 4 a sectional view, of one of the diaphragm-plates drawn to an enlarged scale. Fig. 5 is a sectional view, and Fig. 6 an end view, of a thimble or sleeve adapted to be applied between the two valve-clappers.

While my invention is applicable to the construction of regulators in which either a diaphragm or a piston is used to control the valve, I here show and describe it as provided with a diaphragm, which I prefer; but it will be understood that by the use of the term "diaphragm" in the following description and claims I do not exclude the use of a piston, except where I specifically refer to the construction of the diaphragm-plates with holes.

In many particulars my present regulator is similar to the regulator of Patent No. 534,951, dated February 26, 1895. The body of the regulator comprises the valve-casing proper, A, with an upper dish-shaped part A', suitably mounted upon or formed in one with the valve-casing. The latter has an inlet X and an outlet Y, and has seats $a$ and $a'$ for the balanced valve B, which is carried by the spindle S. This spindle passes vertically through the upper part of the casing with a tolerably close fit, which under the high pressures used will nevertheless allow of the passage of sufficient air around the spindle to the pressure-chamber below the diaphragm D from the delivery side of the valve to act upon the diaphragm in opposition to the spring or weight. The upper end of the spindle is secured in any suitable way to the center of the diaphragm D, the outer rim of which is clamped to the outer rim of the dish-shaped part A' by an open cover $A^2$, bolted thereto. I construct this diaphragm D of a number of flexible plates, such as shown in Figs. 3 and 4, in order to withstand the high pressure; and to prevent this high pressure from buckling or bulging the diaphragm in case of possible leakage of air past the lower plate of the diaphragm the upper or outer plates are provided with openings $d$, Figs. 3 and 4. This feature of invention is applicable to other devices, such as gages or recorders, which use diaphragms subject to pressures. To act against this fluid-pressure upon the under side of the diaphragm, I have shown a spring-and-lever arrangement similar to that shown and described in the above-mentioned patent and comprising the counteracting compression-spring W, toggle-levers T T', links $t\ t'$, and rod R, with adjusting-nut $r'$.

In the construction of balanced regulator-valves such as shown in the said patent, for instance, with beveled seats, it has been found difficult to maintain perfectly-tight joints under high pressures. I therefore construct the clappers $b$ and $b'$ of my present regulator-valve with flat bearing-faces and relatively soft material to make the joint. I prefer to mount this relatively soft bearing material upon the clappers, and in the drawings each clapper is shown as carrying a ring E, of soft material, held in place at its outer edge by a flanged ring $e$, screwed onto the periphery of the clapper. In the case of the upper clapper a shoulder $s$ on the spindle clamps the inner edge of the ring to the face of the clapper-disk, while in case of the lower clapper a flanged thimble F, interposed between the two clappers, clamps the inner edge of the ring to the lower clapper-disk. One or more annular ribs $c$ may be formed on the upper face of each clapper-disk, as shown in Fig. 1, to further aid in preventing leakage of air around the joints of these inserted rings when the valve is closed. The bearing-faces of the clapper thus constructed bear against annular rims $f$ on the under sides of the openings forming the valve-seats. To make this valve as nearly balanced as possible, it is important that the two valves should be of equal diameters and that the diameters of the valve-seats should be equal, and I therefore construct the valve-casing so that the upper clapper can be inserted from the side. For this purpose the inlet side of the valve is provided with a detachable bonnet $A^3$, into which the delivery-pipe X is fitted and which is bolted by bolts $a^2$ to the casing. The opening $x$, leading into the space between the two valve-seats, is made of the oblong shape illustrated in Fig. 2 to permit of the upper clapper-disk being inserted therethrough into position between the two valve-seats. Then the spindle S, being inserted from above, can be passed through this upper clapper-disk, the sleeve F inserted from below, (the plug P being out,) and then finally the bottom clapper can be screwed onto the lower threaded end of the spindle S.

In the use of these high-pressure regulators, particularly in such cases as on compressed-air motors upon cars, it sometimes becomes desirable, if not necessary, to quickly accelerate the delivery-pressure—as, for instance, in climbing a grade or starting a heavy load. To provide for this, I apply to the pressure-chamber below the diaphragm a controlled outlet (marked II) leading, say, to the platform of the car, where a valve can be provided. By opening this valve the pressure on the under side of the diaphragm will be quickly lessened, so that the counteracting-spring W will throw the regulator-valve farther open and give an increased air-pressure to the motor. There will be a slight loss of air by this action, but it will be comparatively trifling.

I claim as my invention—

1. A pressure-regulator having a diaphragm subjected to the action of delivery-pressure, a spindle passing through the casing with a close fit and connected to said diaphragm, two valve-clappers adapted to be secured to the spindle, the casing having seats for the clappers and an oblong opening leading to the space between the seats for the insertion therethrough of the upper clapper in putting the valve together, substantially as described.

2. A regulator-valve having a pair of clapper-disks with flat bearing-faces bearing-rings secured thereto, flanged rings holding the outer edges of the bearing-rings in place and a shouldered spindle and sleeve to clamp the inner edges of the bearing-rings, substantially as described.

3. A pressure-regulator or other such device having a flexible diaphragm adapted to be subjected to the delivery-pressure, said diaphragm being composed of a number of plates, the upper ones having perforations, as and for the purpose described.

4. A pressure-regulator having a valve and diaphragm with a pressure-chamber on one side, and a contracted connection between this chamber and the delivery side of the valve, in combination with a controlled outlet from said pressure-chamber, whereby the delivery-pressure may be accelerated, when desired.

In testimony whereof I have signed my name to this specification in the presence of two subscribing witnesses.

JOHN M. FOSTER.

Witnesses:
  EDITH J. GRISWOLD,
  HUBERT HOWSON.